(12) United States Patent
Inamoto

(10) Patent No.: US 7,274,522 B2
(45) Date of Patent: Sep. 25, 2007

(54) REFLECTIVE OPTICAL SYSTEM

(75) Inventor: Masayuki Inamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 76 days.

(21) Appl. No.: 11/081,739

(22) Filed: Mar. 17, 2005

(65) Prior Publication Data
US 2005/0207038 A1  Sep. 22, 2005

(30) Foreign Application Priority Data
Mar. 17, 2004   (JP)   ............................. 2004-076947

(51) Int. Cl.
*G02B 5/04* (2006.01)
*G03B 21/28* (2006.01)

(52) U.S. Cl. ........................................ 359/834; 353/81

(58) Field of Classification Search ................ 359/834, 359/856, 857, 630, 631, 633; 353/50, 51, 353/81; 348/744
See application file for complete search history.

(56) References Cited

U.S. PATENT DOCUMENTS

| | | | |
|---|---|---|---|
| 4,634,223 A * | 1/1987 | Ishii | 359/613 |
| 6,178,048 B1 * | 1/2001 | Togino et al. | 359/637 |
| 6,268,963 B1 * | 7/2001 | Akiyama | 359/631 |
| 6,850,370 B2 * | 2/2005 | Togino | 359/631 |
| 6,876,390 B1 * | 4/2005 | Nagata | 348/335 |

FOREIGN PATENT DOCUMENTS

| | | |
|---|---|---|
| JP | 2002-40326 | 2/2002 |
| JP | 2002-55306 | 2/2002 |
| JP | 2003-29149 | 1/2003 |

\* cited by examiner

*Primary Examiner*—Alessandro Amari
(74) *Attorney, Agent, or Firm*—Young & Thompson

(57) ABSTRACT

A reflective optical system for projectors comprises a single integral piece of transparent optical molding having at least an incident surface, an exit surface, and two or more internal reflection surfaces between the incident surface and the exit surface, each reflection power having a power, positive or negative. The reflective optical system is provided with grooves, desirably blackened grooves, formed between the internal reflection surfaces so as to block out undesirable light proceeding therein. The internal reflection surfaces are formed by coating an aluminum film on an outer wall of the transparent optical molding. The reflective optical system reflects incoming image bearing light through the incident surface on the internal reflection surfaces in turn and projects the image bearing light through the exit surface so as thereby to project an image on a remote screen.

7 Claims, 2 Drawing Sheets

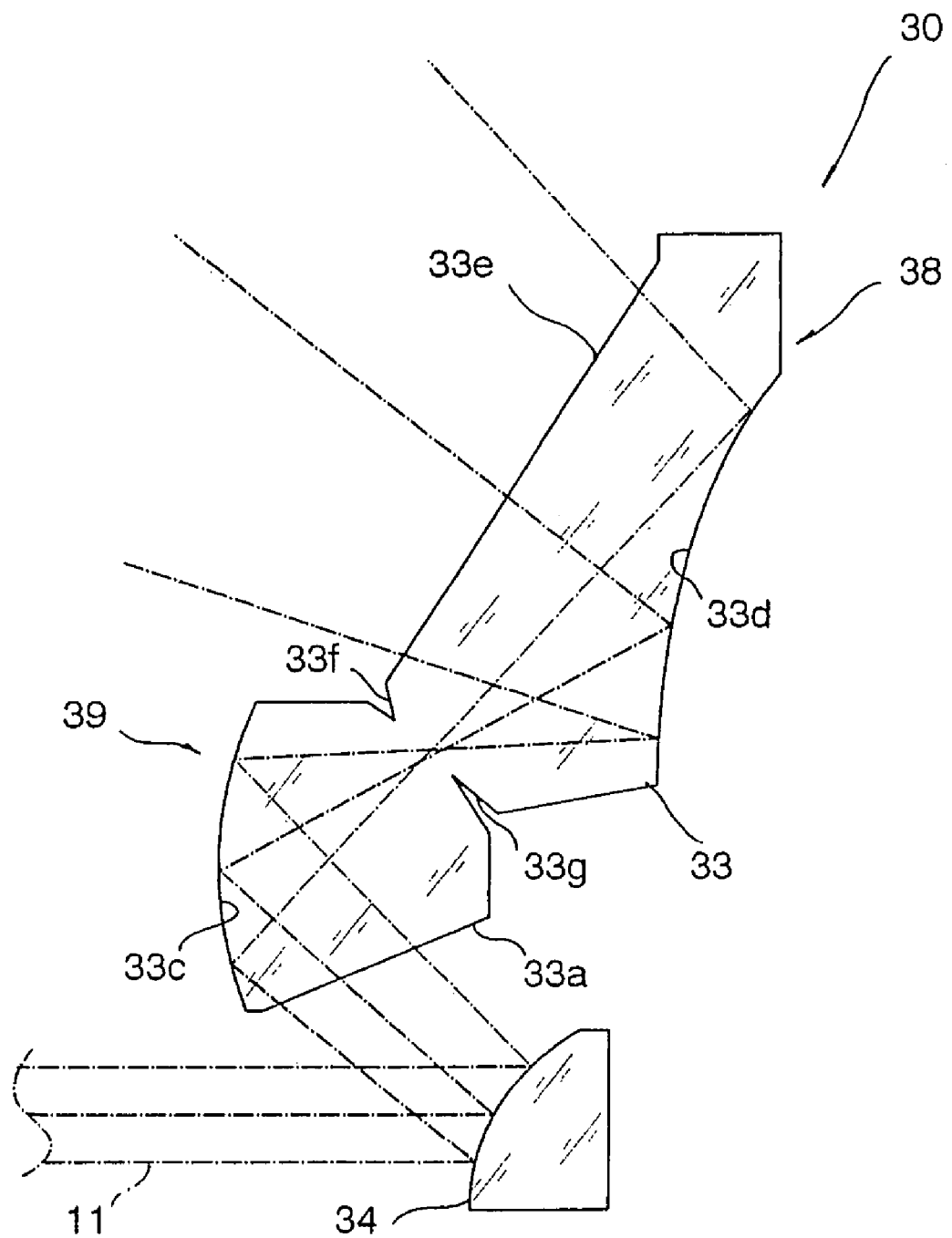

REFLECTIVE OPTICAL SYSTEM

BACKGROUND OF THE INVENTION

1. Field of the Invention

The present invention relates to a reflective optical system used for projectors or projection televisions to modulate and project image bearing light as an enlarged image on a screen.

2. Description of Related Art

Projectors for projecting images on a remote wide screen are provided with a projection optical system comprises a large number of lenses. Such a projector is unavoidably large in size. Apertures, curvatures and weight of these lenses used in the projection optical system exert various restraints on proximity wide-angle projection. In recent years, there have been proposed reflective projectors for projecting images on a wide screen at a short distance. Such a reflective projector is provided with a wide-angle projection optical system including an image display device or element such as a liquid crystal display device or a digital mirror device (DMD). The projection optical system disclosed in, for example, Japanese Unexamined Patent Publication No. 2002-40326 includes a folded reflective optical system including a plurality of reflection mirrors for reflecting image bearing light from the image display device for repeating reflection of image bearing light for enlarged image projection on a wide screen at a comparatively short distance. Using the folded reflective optical system enables wide-angle projection at a short distance and makes the projector compact in size. Moreover, the folded reflective optical system provides high resolution images.

However, the reflective optical system including a plurality of reflection mirrors encounters a difficulty in arranging the reflection mirrors in precise relative positions. In the case of, for example, a folded reflective optical system for a projector disclosed in Japanese Unexamined Patent Publication No. 2003-29149 in which six reflection mirrors are used for the purpose of aberration correction, there is an essential demand for the reflective optical system that mirror parts have to be not only prepared with high precision but arranged and fixed with a high degree of accuracy when attempting to miniaturize the projector and/or to enable wide-angle projection. This demand results in a drop in manufacturing efficiency and a raise in manufacturing cost.

Further, as disclosed, for example, in Japanese Unexamined Patent Publication No. 2003-29149, the reflective optical system is installed by mounting reflection mirrors to a housing. In order to avoid an occurrence of aberration such as distortion due to an accumulated error of registration of the reflection mirrors, the reflection mirrors have to be installed and fixed with a high degree of accuracy and also have to be adjusted precisely in position after installation.

SUMMARY OF THE INVENTION

It is an object of the present invention to provide a reflective optical system for a projector that eliminates the need for troublesome assembling work and positional adjustment operation of a plurality of reflection elements and can retain a high degree of registration of the reflection elements.

The foregoing object of the present invention is accomplished by a reflective optical system comprising a single integral piece of transparent optical molding that has at least two internal reflection surfaces between an incident surface and an exit surface, one of the two internal reflection surfaces that is adjacent to the exit surface has a negative power and the other having a positive power 4. It is preferred that the single integral piece of transparent optical molding has grooves formed between the two internal reflection surfaces so as to block out undesirable light such as stray light and diffused light reflected on the other of the two internal reflection surfaces. The grooves may be painted with blacking. It is further preferred that at least one of the two internal reflection surfaces consists of an aspheric surface and/or that either one or both of the incident and exit surfaces may have a lens power.

According to the configuration of the reflective optical system in which the incident and exit surfaces and a plurality of internal reflection surfaces are formed on the single integral piece of transparent optical molding, while the reflective optical system is miniaturized as one whole, it is realized to retain the reflection surfaces in relative position with a high degree of accuracy. Moreover, it is achieved to reduce the number of parts, to simplify the production process, and further to eliminate work of adjusting relative positions among the reflection surfaces. This is results in an enhancement of production efficiency and reductions in production cost. On the other hand, the reflective optical system prevents the reflection surfaces from getting scratched, stained or covered with dust, so as to maintain its intinsic optical performance.

In addition, the reflective optical system having at least one aspheric reflection corrects aberration of light with a high degree of accuracy. Further, the reflective optical system having a power either one or both of the incident and exit surfaces, so as to enable efficient aberration correction and wide-angle projection.

The reflective optical system having grooves, preferably blackened grooves, formed between the two internal reflection surfaces blocks out stray light and diffused light reflected on the other internal reflection surface and prevents light from scattering, so as to prevent deterioration in the quality of image.

BRIEF DESCRIPTION OF THE DRAWINGS

The foregoing and other objects and features of the present invention will be clearly understood from the following detailed description when reading with reference to the accompanying drawings, wherein the same reference signs have been used to denote same or similar parts throughout the drawings, and in which:

FIG. 2 is a schematic sectional view of a reflective optical system according to alternative embodiment of the present invention.

DETAILED DESCRIPTION OF THE PREFERRED EMBODIMENTS

Figure 1:
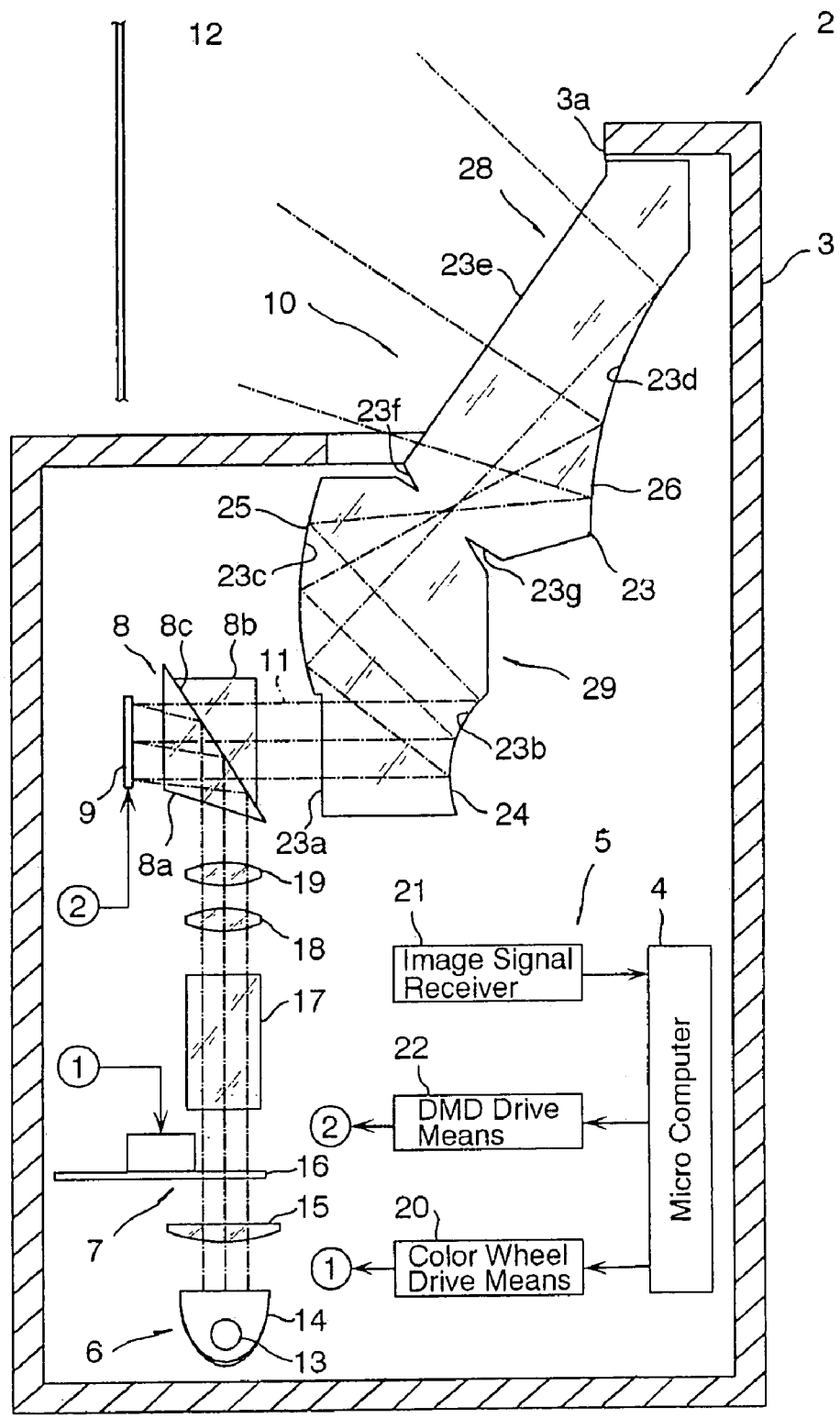
FIG. 1 is a schematic sectional view of a projector with a reflective optical system according to an embodiment of the present invention.

Referring to the accompanying drawings in detail, and in particular, to FIG. 1 schematically showing a projector 2 equipped with a reflective projection optical system 10 for enlarging projection according to a preferred embodiment of the present invention, the projector 2 has a generally box-shaped housing 3 with an opening 3a formed at the top thereof. There are a display control unit 5, an illumination system 7, a DMD (Digital Mirror Display) 9, a total internal reflection (TIR) prism system 8, and a reflective projection optical system 10 compactly arranged in the housing 3. The display unit 5 includes a microcomputer 4, an image data receiver 21, a DMD driver 22 and a color wheel driver 20. The illumination system 6 comprises a light source unit 6A including a light source 13, for example a white light source such as a xenon lamp or a mercury lamp, and a reflector 14 for reflecting back white light emanating from the light source 13 and an illumination optical system 6B for receiving the white light outputted from the light source unit 6A and outputting the light toward the TIR prism system 8 for the DMD 9. The illumination optical system 6B includes a condenser lens 15 for collecting the white light outputted from the light source unit 6A, a color wheel 16 for separating incoming light into three primary color components, namely red (R), green (G) and blue (B) light, an optical integrator rod 17 for outputting incoming light by generating the light of a certain uniform luminous flux density, and a pair of relay lenses 18 and 19. The color wheel 16 is made up of a rotary disc having three isometric filter segments, namely R, G and B filters, arranged at approximately regular distances from the axis of rotation of the rotary disc. The color wheel 16 is controlled by the color wheel driver 20 to rotate at a regular speed so as to separate the incoming white light collected by the condenser lens 15 into time-shared R, G and B light, respectively.

The integrator rod 17 is made up of a glass rod with a kaleidoscope formed therein so as to homogenize a luminous flux density of the incoming light by color. In this instance, the integrator rod 17 internally total reflects the incoming light, R, G or B, repeatedly for homogenization and outputs them in a uniform luminous flux intensity. The R, G and B light exiting the integrator rod 17 are focused by the relay lenses 18 and 19 onto the DMD 9 through the TIR prism system 8 for a separation between illumination and projection light. The TIR prism system 8 for the DMD 9 is made up of two triangular prisms, namely an incident prism 8a disposed in close proximity to the DMD 9 and an exit prism 8b disposed adjacently to the reflective projection optical system 10 which are coupled to each other at a certain angle and have refractive indexes different from each other. As an angle of the illumination light incident upon an interface, i.e. an internal reflection surface 8c, of the TIR prism system 8 is larger than a critical angle, the incoming illumination light are total reflected by the internal reflection surface 8c back through the TIR prism system 8 and impinge on the DMD 9. However, as an incident angle of the projection light reflected by the DMD 9 upon the internal reflection surface 8c of the TIR prism system 8 is smaller than the critical angle, the projection light reflected by the DMD 9 enter the TIR prism system 8 and pass through the internal reflection surface 8c, and the exit the TIR prism system 8.

The DMD 9 is a projection type display element that is a microchip made such that a considerably large number of micromirrors are planted for pixels on a silicon wafer with a certain interval in a matrix pattern. The large number of digital micromirrors planted on the microchip are able to display images on a certain screen by being controlled locations in two modes of ON and OFF so as to reflect the incident light within a certain angle range of, for example, ±10°. ON- or OFF-state of the DMD 9 is decided according to the positions of the digital mocromirrors planted on the DMD 9. For example, if the digital micromirrors are slanted at an angle of certain degrees in one direction (for example +10°), the DMD 9 is in ON-state and reflects light impinging thereon so that the TIR prism system 8 outputs the light reflected by the DMD 9 on the reflective projection optical system 10. Also, if the digital micromirrors are slanted at an angle of certain degrees in an opposite direction (for example −10°), the DMD 9 is in OFF-state and reflects light impinging thereon so that the TIR prism system 8 total reflects and outputs the light reflected by the DMD 9 to another direction not to the reflective projection optical system 10. ON-state light coming out of the TIR prism system 8 and following a path 11 to enter the reflective projection optical system 10 form an optical image to be projected on a screen 12.

The display control unit 5 receives color image data from an external terminal equipment data (not shown) and transmits the color image data to the microcomputer 4 through the image data receiver 21. The microcomputer 4 processes the color image data to frame sequential R, G and B image data, sequential frames of which are conveyed to DMD 9 through the DMD driver 22 in proper synchronism with the color wheel 16 driven by the color wheel driver 20.

The reflective projection optical system 10 for enlarging projection is made up of a single integral piece of anomalous polyhedral optics 23 such as a transparent solid glass molding or a transparent plastic molding having a generally dog-leg shaped vertical section. The anomalous polyhedral optics 23 is sectionalized by wedge grooves 23f and 23g into two prismatic sections, namely a lower section 29 generally resembling a regular prism in shape and an upper section 28 resembling a triangular prism in shape. The lower section 29 receives the light proceeding from the TIR prism system 8 on an incident surface 23a, total reflects the light on a first internal reflection surface 23b having a negative power and further on a second internal reflection surface 23c having a positive power, and then transmits the light into the upper section 28. The upper section 28 total reflects the light transmitted from the lower section 29 on a third internal reflection surface 23d having a negative power and outputs the light through an exit surface 23e. Herein, the incident surface 23a is placed in parallel with an exit surface of the exit prism 8b of the TIR prism system 8 so as to receive the light proceeding from the TIR prism system 8 perpendicularly, and the exit surface 23e is inclined with respect to the screen 12 at a certain angle. Between the incident and exit surfaces 23a and 23e the first to third internal reflection surfaces 23b, 23c and 23d are formed so that the incoming light are reflected and follow a zigzag path. More specifically, the first internal reflection surface 23b is an aspheric surface convex on the inside so as to reflect the incoming light backward up to the second internal reflection surface 23c. The first internal reflection surface 23b is an aspheric surface concave on the inside so as to reflect the proceeding light from the first internal reflection surface 23b backward up to the third internal reflection surface 23d. The third internal reflection surface 23d is an aspheric surface convex on the inside so as to reflect the proceeding light from the second internal reflection surface 23c backward up to the exit surface 23e. The anomalous polyhedral optics 23 is coated with aluminum films on exterior surfaces 24, 25 and 26 of the first to third internal reflection surfaces 23b, 23c and 23d, respectively. Further, the anomalous polyhedral optics 23 is painted with blacking on the wedge grooves 23f and 23g. The reflective projection optical system 10 thus configured is mounted in the top opening 3a of the housing 3 so as to expose the exit surface 23e to the outside.

The reflective projection optical system 10 described above is fabricated as below. First of all, a transparent solid glass is molded to prepare the anomalous polyhedral glass block 23 with the incident surface 23a, first to third aspheric surfaces 24, 25 and 26, the exit surface 23e, and the wedge grooves 23f and 23g formed thereon. Thereafter, the anomalous polyhedral glass block 23 is coated with aluminum films on the exterior surfaces 24, 25 and 26, respectively, in vacuum evaporation and painted with a black paint on the wedge grooves 23f and 23g. In such a way, the reflective projection optical system 10 is completed.

In assembling the projector 2, all the elements, parts and units, except for the reflective prbjection optical system 10, are installed in position within the housing 3 first. Thereafter, the reflective projection optical system 10 is fitted into the opening 3a of the housing 3. In doing so, the first to third internal reflection surfaces 23b, 23c and 23d are automatically put in position by adjusting the incident and exit surfaces 23a and 23e in position precisely with respect to the projection optical axis. Specifically, the first to third internal reflection surfaces 23b, 23c and 23d are aligned so as to reflect incoming light through the incident surface 23a along the path 11 in order toward the exit surface 23e by positioning accurately the incident surface 23a so as to be in parallel with the exit surface of the exit prism 8b of the TIR prism system 8 and locating the exit surface 23e within the opening 3a of the housing 3. In this manner, no positional adjustment work is required for the respective internal reflection surfaces 23b to 23e. Furthermore, if light reflected on the second internal reflection surface 23c includes undesirable light such as stray light or diffusely reflected light, the internal surfaces of the wedge grooves 23f and 23g block out the undesirable light. Therefore, only the desired light travels toward the third internal reflection surface 23d passing between the of the wedge grooves 23f and 23g. This prevents deterioration of an image projected on the screen 12. The reflective projection optical system 10 thus installed in the projector 2 total reflects ON-state light incoming through the incident surface 23a on these internal reflection surfaces 23b, 23c and 23d in this order and projects them through the exit surface 23e, so as to project an enlarged quality image on the screen 12.

As described above, the integral formation of the reflective projection optical system 10, that has the three internal reflection surfaces 23b, 23c and 23d and the wedge grooves 23f and 23g in addition to the incident and exit surfaces 23a and 23e, can be installed into the housing 3 with the internal reflection surfaces 23b, 23c and 23d fixed precisely in relative position, so as to avoid precise adjustment of relative positions among them that is essential and troublesome in the case where a plurality of reflective mirrors must be precisely installed and correctively positioned like the conventional reflective projection optical systems. The dimensional accuracy of the reflective projection optical system 10 depends on the accuracy of a metal mold, so that the reflective projection optical system 10 does not produce aberration of light due to an accumulation of slight errors in positioning the respective reflective surfaces independently. Moreover, since the internal reflection surfaces 23b, 23c and 23d are formed in the shape of aspheric mirror surface, aberration of light are reliably corrected on the respective inner reflection surfaces 23b, 23c and 23d, so as to enable projection of a stable and high resolution image on the screen 12.

In the above embodiment, although the incident and exit surfaces 23a and 23e are formed in the shape of flat surface, either one or both of the incident and exit surfaces 23a and 23e may be formed in the form of lens surface for enabling projection of an enlarged high resolution image on the screen 12 more efficiently. Either one of the wedge grooves 23f and 23f may be left out and, on the other hand, a further wedge groove may be formed in the lower section 28 between the first and second inner reflective surfaces 23b and 23c. As long as undesirable light such as stray light or diffusely reflected light can be blocked out efficiently, the number of wedge grooves is not limited to one or two, and they may be changed in location as appropriate. The reflective projection optical system 10 should have at least two internal reflection surfaces and, however, the number of internal reflection surfaces may be changed as appropriate.

FIG. 2 shows a reflective projection optical system 30 according to an alternative embodiment of the present invention. The reflective projection optical system 30 is installed in an opening 3a of a housing 3 of the projector 2 (see FIG. 1). The projector 2 has almost the same in configuration as the previous embodiment but includes a mirror element 34 with a reflection surface 34 having a negative power thereon. The mirror element 34 is movable in the path 11 of light coming out of the TIR prism system 8. The reflective projection optical system 30 for enlarging projection is made up of a single integral piece of anomalous polyhedral optics 33, such as a transparent solid glass molding or a transparent plastic molding, having a generally dog-leg shaped vertical section. The anomalous polyhedral optics 23 is sectionalized by wedge grooves 33f and 33g into two prismatic sections, namely a lower section 39 and an upper section 38, both resembling a triangular prism in shape. The lower section 39 receives light proceeding from the TIR prism system 8 (see FIG. 1) on an incident surface 33a and total reflects the incoming light on a first internal reflection surface 33c having a positive power, and then transmits the light into the upper section 38. The upper section 38 total reflects the light transmitted from the lower section 39 on a second internal reflection surface 33d having a negative power and outputs the light through an exit surface 33e. The mirror element 34 is adjusted in position in a direction of the path 11 with respect to the TIR prism system 8 and the reflective projection optical system 30 so as to reflect light proceeding from the TIR prism system 8 upward back to the incident surface 33a of the reflective projection optical system 30.

The reflective projection optical system 30 receives ON-state light bearing a color image that proceed from the TIR prism system 8 and are reflected upward back on the mirror element 34 through the incident surface 34a, and then reflects the ON-state light on the first and second internal reflection surfaces 33c and 33d in order so as to project them through the exit surface 23e, so as thereby to project an enlarged color image onto the screen 12 (see FIG. 1).

According this alternative embodiment, a color image can be finely adjusted in focused on the screen 12 and subtly changed in zoom ratio by moving the mirror element 34 in a direction along which movable light coming out of the TIR prism system 8 travel or by changing a distance between the mirror element 34 and the incident surface 34a of the reflective projection optical system 30.

Although the present invention has been described in conjunction with a digital camera by way of exemplary application, it is embodied in digital video cameras and cellular phones, and even in conventional cameras for use with silver films. Further, various other embodiments and variants may occur to those skilled in the art, which are within the scope and spirit of the invention, and such other embodiments and variants are intended to be covered by the following claims.

What is claimed is:

1. A reflective optical system for projecting light comprising:

a single integral transparent optical element having at least two internal reflection surfaces between an incident surface and an exit surface, each said internal reflection surface having a power; and a negative power reflecting element separate from the integral transparent optical element and positioned so that light reflecting off of the reflecting element falls upon the incident surface of the integral transparent optical element;

wherein at least one of said at least two internal reflection surfaces consists of an aspheric surface, at least one of said incident surface and said exit surface has a power; and wherein said single integral transparent optical element has grooves formed between said at least two internal reflection surfaces so as to block out stray light and/or diffused light reflected on at least one of said at least two internal reflection surfaces.

2. A reflective optical system for projecting light comprising:

a single integral transparent optical element having at least two internal reflection surfaces between an incident surface and an exit surface each said internal reflection surface having a power; and a negative power reflecting element separate from the integral transparent optical element and positioned so that light reflecting off of the reflecting element falls upon the incident surface of the integral transparent optical element;

wherein at least one of said incident surface and said exit surface has a power; and wherein said single integral transparent optical element has grooves formed between said at least two internal reflection surfaces so as to block out stray light and/or diffused light reflected on at least one of said at least two internal reflection surfaces.

3. A reflective optical system for projecting light comprising:

a single integral transparent optical element having at least two internal reflection surfaces between an incident surface and an exit surface, each said internal reflection surface having a power; and a negative power reflecting element separate from the integral transparent optical element and positioned so that light reflecting off of the reflecting element falls upon the incident surface of the integral transparent optical element;

wherein said single integral transparent optical element has grooves formed between said at least two internal reflection surfaces so as to block out stray light and/or diffused light reflected on at least one of said at least two internal reflection surfaces.

4. The reflective optical system as defined in claim 3, wherein each said grooves is painted with blacking.

5. The reflective optical system of claim 3, wherein the integral optical transparent element and the negative power reflecting element are arranged to be movable with respect to one another so as to provide for focus adjustment of light exiting the integral optical transparent element.

6. The reflective optical system of claim 5, wherein the relative movement of the integral optical transparent element with respect to the negative power reflecting element occurs through movement of the negative power reflecting element along an optical axis of light falling incident upon the negative power reflecting element.

7. The reflective optical system of claim 5, wherein the relative movement of the integral optical transparent element with respect to the negative power reflecting element occurs through movement of the negative power reflecting element toward or away from the incident surface of the integral optical transparent element.

* * * * *